United States Patent [19]

Jiles

[11] Patent Number: 5,012,189

[45] Date of Patent: Apr. 30, 1991

[54] METHOD FOR DERIVING INFORMATION REGARDING STRESS FROM A STRESSED FERROMAGNETIC MATERIAL

[75] Inventor: David C. Jiles, Ames, Iowa

[73] Assignee: Iowa State University Research Foundation, Inc., Ames, Iowa

[21] Appl. No.: 354,819

[22] Filed: May 22, 1989

[51] Int. Cl.$^5$ .................... G01B 7/24; G01R 33/18
[52] U.S. Cl. .................................................. 324/209
[58] Field of Search ............... 324/209, 228, 262, 222, 324/223, 232, 227

[56] References Cited

U.S. PATENT DOCUMENTS

| | | | |
|---|---|---|---|
| 19,600 | 6/1835 | Hermann | 175/183 |
| 1,925,872 | 9/1933 | Hermann | 175/183 |
| 2,656,714 | 10/1953 | Cartier | 73/67 |
| 2,912,642 | 11/1959 | Dahle | 324/34 |
| 3,184,963 | 5/1965 | Dahle | 73/88.5 |
| 3,427,872 | 2/1969 | Leep et al. | 73/88.5 |
| 3,706,029 | 12/1972 | Wandling et al. | 324/40 |
| 3,925,724 | 12/1975 | Steingroever | 324/34 R |
| 4,048,851 | 9/1977 | Portier | 73/141 A |
| 4,138,783 | 2/1979 | Portier | 29/606 |
| 4,316,146 | 2/1982 | Jilken | 324/209 |
| 4,408,160 | 10/1983 | King et al. | 324/209 |
| 4,449,095 | 5/1984 | Steingroever et al. | 324/223 |
| 4,481,470 | 11/1984 | Wallace | 324/228 |
| 4,497,209 | 2/1985 | Kwun et al. | 73/601 |
| 4,523,482 | 6/1985 | Barkhoudarian | 73/862.36 |
| 4,623,841 | 11/1986 | Stinson et al. | 324/223 |
| 4,689,558 | 8/1987 | Ruuskanen et al. | 324/209 |
| 4,746,858 | 5/1988 | Metala et al. | 324/200 |

FOREIGN PATENT DOCUMENTS 447653 10/1974 U.S.S.R. .
532067 10/1976 U.S.S.R. .
883827 11/1987 U.S.S.R. .

OTHER PUBLICATIONS

Bozorth, "Ferromagnetism", Van Nostrand, New York, 12/1951, pp. 8, 9, 507, 512, 549, 612.

D. C. Jiles, "The Effect of Compressive Plastic Deformation on the Magnetic Properties of AISI 4130 Steels with Various Microstructures", J. Phys. D. Appl. Phys. 21, 12/1988), pp. 1–9.

D. C. Jiles and D. L. Atherton, "Theory of Ferromagnetic Hysteresis (invited)", J. Appl. Phys. 55(6), Mar. 15, 1984, pp. 2115–2120.

"Theory of the Magnetisation Process in Ferromagnets and its Application to the Magnetomechanical Effect", D. C. Jiles and D. L. Atherton, The Institute of Physics, 12/1984, pp. 1265–1281.

Primary Examiner—Walter E. Snow
Attorney, Agent, or Firm—Leydig, Voit & Mayer

[57] ABSTRACT

A non-destructive evaluation technique for deriving stress in ferromagnetic materials including deriving anhysteretic and hysteresis magnetization curves for the material in both unstressed and stressed states. The anhysteretic curve is expressed as a Langevin function. The stress is expressed as an equivalent magnetic field dependent on stress and change of magnetostriction with magnetization. By measurement of these bulk magnetic properties, stress can be derived.

6 Claims, No Drawings

METHOD FOR DERIVING INFORMATION REGARDING STRESS FROM A STRESSED FERROMAGNETIC MATERIAL

GRANT REFERENCE

This invention was made with Government support under Contract No. W-7405ENG82 awarded by the Department of Energy. The Government has certain rights in the invention.

BACKGROUND OF THE INVENTION

1. Field of the Invention

The present invention relates to non-destructive evaluation of magnetizable materials, and in particular, to the non-destructive evaluation of stress in ferromagnetic materials.

2. Problems in the Art

The relationship between certain magnetic properties and certain characteristics of magnetizable materials is known in the art. For some 40 years or so, investigations into magnetization measurements as they relate to the structure of magnetizable specimens have occurred. It then became well known to some that relationships exist between magnetic properties and strain or stress in these materials.

Although various generalized correlations have been derived between individual magnetic properties and stress in magnetizable materials, a complete and practical understanding has not been achieved. This is particularly true of ferromagnetic materials.

The advantages and benefits of such an understanding would be significant. It would allow superior non-destructive evaluation (NDE) of materials such as steel, which is so pervasively used in our society. There is a real need to achieve the ability to non-destructively and efficiently derive information regarding stress in such materials. Advances in understanding the effect of stress on different materials would allow valuable insight into how materials behave under stress and how to evaluate stress. An example would be the non-destructive evaluation of construction steels.

Most current evaluation techniques are either destructive, or utilize non-destructive evaluation methods such as x-ray diffraction or ultrasound. The disadvantages of destructive evaluation are obvious.

X-ray diffraction requires costly and complex equipment, and a significant amount of time. It is also generally limited to deriving information from little more than surface layers of the material under analysis.

Ultrasound is being shown to be a valuable NDE tool, but it has limitations also. For example, material variables such as preferred grain orientation, composition, prior magnetic history (which is significant in steels), and inhomogeneity, can effect or even mask results.

As stated, while there has been significant work done investigating the relationship of magnetization properties with stress, it has not been fully understood or developed. The relationships are very complex. Most activity has been done with respect to applied stress (sometimes referred to as elastic strain) on materials. Relatively little work has been done on residual stress (sometimes referred to as plastic deformation), and there is even less understanding regarding the relationships in that area.

As is well known, the magnetization of a magnetizable material can be represented by a plot of flux density B in the material versus a varying applied magnetic field of intensity H. What are referred to as the anhysteretic magnetization curve and hysteresis magnetization curve, plotted in terms of B versus H, are also well known in the art. See for example, R.M. Bozorth, "Ferromagnetism", Van Nostrand, New York, 1951, which is incorporated by reference herein. See particularly pages 8-9, Chapter 11, pages 507, 512, and 548-549. These curves vary from material to material. Also, as has been previously discussed, stress can affect these curves.

All magnetizable materials have properties which can be characterized as giving each particular material its own magnetic "signature". Many of these properties are related to the anhysteretic and hysteresis magnetization curves. Examples of these properties are coercivity, hysteresis loss, initial permeability and susceptibility, remanence, hysteretic permeability and susceptibility, differential susceptibility, and maximum differential permeability and susceptibility. All of these properties are well known to those skilled in the art. It is also well known that susceptibility can be derived by subtracting unity from permeability.

It has been found that these properties are related not only to the microstructure of ferromagnetic materials, but also to the mechanical treatment of the material. That is, stress or strain, whether applied or residual, can effect these properties.

However, there is yet to be an understanding of the meaning of any of the general relationships between stress and those properties to be useful in practical application.

Even though it is observed that the anhysteretic and hysteresis curves, and correspondingly many of the magnetic parameters, vary with stress in the material, the observed changes are complex. Relationships have not been able to be reliably articulated.

Therefore, it is a principal object of the present invention to improve over or solve the deficiencies and problems in the art.

A further object of the present invention is to provide a method for evaluation of stress in ferromagnetic materials from hysteresis curves and anhysteresis curves which provides a practical understanding of these relationships sufficient to allow useful evaluation of stress.

Another object of the present invention is to provide a method as above described which presents a simple expression for the variation of anhysteretic differential susceptibility at the origin (defined by M=0, H=0) with stress.

A still further object of the present invention is to provide a method as above described which is useful to utilize magnetization measurements to derive information regarding stress of a ferromagnetic material.

Another object of the present invention is to provide a method as above described which is useful with regard to ferromagnetic materials having residual stress, as well as applied stress.

These and other objects, features, and advantages of the present invention will become more apparent with reference to the accompanying specification and claims.

SUMMARY OF THE INVENTION

The present invention allows derivation of meaningful relationships between measured magnetic properties of a ferromagnetic material and stress in the material.

Anhysteretic and hysteresis magnetization curves are obtained for a particular material being evaluated by measuring changes in magnetization as different fields are applied to the material.

As is well known, magnetic parameters such as coercivity, hysteresis loss, remanence, permeability, differential permeability, and anhysteretic magnetization are then derivable from the knowledge gained by the measurements and curves.

Anhysteretic differential susceptibility represents the slope of the anhysteretic magnetization curve. It is known that the anhysteretic curve varies with stress. The invention utilizes a mathematical expression for defining the anhysteretic curve in terms of the magnetic field.

The relationship between stress and magnetization has allowed stress to be characterized as an equivalent magnetic field itself. The mathematical characterization of stress as an equivalent magnetic field is then combined with the mathematical expression defining the anhysteretic magnetization curve which depends on the stress in the material, and the rate of change of magnetostriction with magnetization.

Because the interest is in how the magnetic properties are changing with magnetization, the relationship between magnetostriction with respect to magnetization is utilized with empirical data to transform the expression defining the anhysteretic curve, which has previously been combined with the expression for the equivalent magnetic field of stress. This allows anhysteretic differential susceptibility to be characterized by a simple mathematical expression related to stress.

By taking measurements of the material, first in an unstressed condition, and secondly, in a stressed condition, stress can be derived.

By utilizing these certain measurements, the direct relationship between the information from the anhysteretic and hysteresis curves can be utilized to derive information regarding the stress in the material. With such knowledge, stress can be evaluated in ferromagnetic materials by the simple measurement processes associated with deriving anhysteretic and hysteresis magnetization curves.

DETAILED DESCRIPTION OF THE PREFERRED EMBODIMENT

To aid in an understanding of the invention, a detailed description of one preferred embodiment of the invention will be set forth. It is to be understood that this description does not limit the invention, which is defined solely by the claims following this description.

As previously mentioned, general relationships are known in the art to exist between magnetic properties of ferromagnetic material and stress, either applied or residual, in the material. This can be shown by changes in magnetic parameters such as coercivity, hysteresis loss, remanence, permeability, hysteretic permeability and susceptibility, differential susceptibility, maximum differential permeability and susceptibility, and anhysteretic magnetization, to name a few, for various levels of stress in ferromagnetic materials.

These types of magnetic properties can be derived from the process involved in obtaining anhysteretic and hysteresis magnetization curves for a material. This process is well known to those skilled in the art.

While changes in the magnetic parameters are known to occur for different amounts of stress, an understanding of this phenomenon has not been sufficient to allow it to be used to predict or estimate with any reliability what the actual stress in the material is.

Reference is taken to Bozorth, "Ferromagnetism", Van Nostrand, New York, 1951, with regard to these general concepts, and which is incorporated by reference herein.

In the preferred embodiment, this problem has been overcome and quantified. A relationship between stress applied to a ferromagnetic material and measurement of the differential susceptibility and anhysteretic susceptibility of the origin has been discovered. This relationship also is believed to apply to residual stress in a ferromagnetic material.

In the preferred embodiment, the magnetic parameter of anhysteretic differential susceptibility at the origin of the anhysteretic curve is utilized to derive stress in the material for non-destructive evaluation purposes. The anhysteretic differential susceptibility at the origin is a measurable bulk magnetic property and represents the slope of the anhysteretic magnetization curve at the origin. By comparing this with susceptibility from an unstressed sample of the same type of material, evaluation of stress in the material under evaluation can be made.

A hysteresis curve is obtained by applying a magnetic field and cycling the field slowly at a given field amplitude. An anhysteretic magnetization curve is obtained by effecting an AC magnetization with a superimposed DC magnetic field. Such is well known in the art.

After saturation, reduction and change in field H does not result in a retracing of the initial anhysteretic magnetization curve, but results in the hysteresis loop, such as is well known in the art.

The theory of ferromagnetic hysteresis has been formally articulated by referring to the concept of uniformly impeded domain wall motion. This theory depends on the displacement of the magnetization M(H) at any point on a hysteresis loop from the anhysteretic magnetization $M_{an}$ (H) at the prevailing field strength. This displacement defines a potential energy which governs the rate of change of magnetization with field. See for example, D. C. Jiles and D. L. Atherton, J. P. Phys. D. (App. Physics) 17, 1265, (1984); D. C. Jiles and D. L. Atherton, J. P. Appl. Phys., 55, 2115, (1984); D. C. Jiles and D. L. Atherton, J. M M. M., 61, 48, (1986), which describe this theory of ferromagnetic hysteresis and are incorporated by reference.

A mathematical expression for the anhysteretic magnetization curve is first utilized.

In the preferred embodiment, a Langevin function is used to represent the anhysteretic magnetization curve as follows:

$$\frac{M_{an}(H)}{M_s} = \coth\left(\frac{H + \alpha M}{a}\right) - \left(\frac{a}{H + \alpha M}\right) \quad \text{(Eq. 1)}$$

, where $M_{an}$ is the anhysteretic magnetization at field strength H; $M_s$ is the saturation magnetization; H is the magnetization field strength; COTH indicates the hyperbolic cotangent; M is the magnetization, and $\alpha$ is a mean field parameter representing interdomain coupling. For additional background information on said parameters, see the Jiles, Atherton references cited above. Particularly, Jiles and Atherton, Vol. 61, pp. 48-60, J. of M.M.M. (North Holland Physics Publishing)

The Langevin function is set forth in P. Langevin, Ann. V.E. Chem. et Phys., Vol. 1, p. 70 (1905) The term $\alpha$ is a representation of temperature and energy which influence magnetization in a material.

To introduce a relationship of the Langevin function to stress, it is to be understood that stress is represented by an equivalent magnetic field $H_\sigma$. Thus, stress in the material is represented by an equivalent magnetic field as follows:

$$H_\sigma = \frac{3}{2} \; \frac{\sigma}{\mu_0} \left(\frac{d\lambda}{dM}\right)_T \quad \text{(Eq. 2)}$$

, where $\sigma$ represents stress, $\lambda$ is the magnetostriction and $\mu_0$ is the permeability of free space. The relationship between change in magnetostriction with magnetization is thus expressed. $d\lambda/dM$ is articulated within the parenthesis with a "T" to denote that it is evaluated at a constant temperature.

By adding the equivalent field related to stress of equation 2 into equation 1, equation 1 then becomes:

$$\frac{M_{an}(H)}{M_s} = \quad \text{(Eq. 3)}$$

$$\coth\left(\frac{H + \alpha M + H_\sigma}{\alpha}\right) - \left(\frac{\alpha}{H + \alpha M + H_\sigma}\right)$$

which defines the anhysteretic magnetization under stress.

The following relationship is then assumed:

$$\lambda = bm^2 \quad \text{(Eq. 4)}$$

where b is a constant or coefficient which relates bulk magnetostriction ($\lambda$) and magnetization (M) and can be empirically derived by a series of measurements of magnetization and resulting magnetostriction. See Jiles, J. Phys. D: Appl. Phys. 21 (1988), "The Effect of Compressive Plastic Deformation on the Magnetic Properties of AISI 4130 Steels With Various Microstructures"; Jiles, "Variation of the Magnetic Properties of AISI 4140 Steels With Plastic Strain", Physicas S. Solidi, which are incorporated by reference.

Equation 4 makes this assumption concerning the behavior of $\lambda$ with respect to M because such is needed to determine the derivative of magnetostriction with respect to magnetization. $\lambda$ must be symmetric in M. Therefore, for low values of magnetization, such as occur at the beginning of the anhysteretic magnetization or at the coercive point, equation 4 is used.

The derivative of equation 4 is as follows:

$$\frac{d\lambda}{dM} = 2bM \quad \text{(Eq. 5)}$$

The value of the coefficient b, as previously stated, can then be determined from experimental data. As an example, for a specimen of AISI 4130 steel $b = 2.4 \times 10^{-18}$ $(A.m^{-1})^{-2}$.

By substitution of equation 5 into equation 2, and further substitution of that expression for $H_\sigma$ in equation 3 renders the following:

$$\frac{M_{an}(H)}{M_s} = \frac{H + \left(\alpha + \frac{3b\sigma}{\mu_0}\right) M_{an}(H)}{3\alpha} \quad \text{(Eq. 6)}$$

The anhysteretic magnetization at the origin is linear in H and allows this expression for small values of H.

A direct relationship is therefore formed between the mathematical expression for the anhysteretic magnetization curve and stress. A standard expression for the differential anhysteretic susceptibility at H=0 under stress $\chi'_{an}(\sigma)$ is utilized. The differential anhysteretic susceptibility is the slope for the anhysteretic curve defined in equation 6.

The differential suspectibility $[\chi'_{an}(\sigma)]_{H=0}$ at the origin of the anhysteretic magnetization curve can be expressed as:

$$[\chi'_{an}(\sigma)]_{H=0} = \frac{M_s}{3\alpha - \left(\alpha + \frac{3b\sigma}{\mu_0}\right) M_s} \quad \text{(Eq. 7)}$$

By utilizing this relationship, analyzing differential and anhysteretic susceptibility at zero stress ($\sigma=0$) and then at stress ($\sigma=\sigma$), the simple expression for deriving stress $\sigma$ can be set forth.

Rewritten, equation 7 is:

$$\frac{1}{[\chi'_{an}(0)]_{H=0}} - \frac{1}{[\chi'_{an}(\sigma)]_{H=0}} = \frac{3b\sigma}{\mu_0} \quad \text{Eq. 8}$$

Where $\chi'_{an}(0)$ refers to differential anhysteretic susceptibility at zero stress, and $\chi'_{an}(\sigma)$ refers to a differential anhysteretic susceptibility at stress ($\sigma$). Equation 8 can then be solved for its only unknown ($\sigma$) to determine stress.

Equation 8 predicts the relationship between applied stress $\sigma$ and the measurement of a bulk magnetic property differential (susceptibility) at the origin. These relationships are discussed in more detail in Garikepati, Chang, and Jiles, *Theory of Ferromacnetic Hysteresis: Evaluation of Stress From Hysteresis Curves*, Proceedings of the Fourth Jt. MMM/Intermag. Conference, Vancouver, Canada, July, 1988; Proceedings published in IEEE Transactions on Magnetics, November, 1988; and is incorporated by reference herein.

It can therefore be seen that the invention achieves at least all of its stated objectives. The invention has developed a way to look at how the slope of the anhysteretic curve varies with stress at the origin. It is applicable to either applied or residual stress. It is believed to be reliable and applicable to stress which is co-axial with the field. It allows an understanding of how the curve changes in orientation or slope after knowing equation 2.

The included preferred embodiment is given by way of example only, and not by way of limitation to the invention, which is solely described by the claims herein. Variations obvious to one skilled in the art will be included within the invention defined by the claims.

What is claimed is:

1. A method for deriving information regarding stress from a stressed ferromagnetic material comprising:
   from an unstressed sample of the ferromagnetic material obtaining reference anhysteretic and hysteresis measures for said unstressed sample;

obtaining an anhysteretic magnetization curve for a selected portion of the material;

obtaining a hysteresis magnetization curve for the same portion of the material;

comparing anhysteretic and hysteresis measures from the obtained curves with the reference anhysteretic and hysteresis measures; and deriving information regarding stress in the stressed ferromagnetic material by the comparison of measures in the stressed and unstressed materials.

2. The method of claim 1 wherein anhysteretic differential susceptibility is analyzed for the unstressed and stressed ferromagnetic material.

3. The method of claim 2 further comprising:

expressing the anhysteretic magnetization curve as a Langevin function;

representing stress in the material as an equivalent magnetic field;

assuming a relationship between magnetostriction and magnetization; and expressing anhysteretic differential susceptibility for both the stressed and unstressed states of the material, and solving for stress out of this expression.

4. A method for detection of stress in a ferromagnetic material comprising:

measuring anhysteretic and hysteresis magnetization data for the material;

deriving magnetic parameters regarding the material from the anhysteretic and hysteresis data;

the magnetic parameters including but not being limited to, bulk magnetostriction, anhysteretic magnetization and hysteretic magnetization defined in terms of flux density versus field strength, where the origin defines zero flux and zero field strength;

determining susceptibility at the origin and differential susceptibility at the coercive point; and deriving from the parameters, including the susceptibility at the origin, information regarding stress.

5. A method of evaluation of stress in ferromagnetic materials from hysteresis curves comprising:

obtaining measurements of magnetic parameters of the material, the magnetic parameters including but not being limited to anhysteretic magnetization curve, hysteresis magnetization curve, bulk magnetostriction in the demagnetized state;

representing stress as an equivalent magnetic field;

representing the anhysteretic curve as a function depending on stress from actual magnetization field strengths;

combining the representation of the equivalent magnetic field of stress with the representation of the anhysteretic curve;

approximating bulk magnetostriction to be equal to a constant times the square of magnetization;

determining the constant from experimental data; and deriving a parameter related to stress from the anhysteretic curve or hysteresis curve.

6. A method for evaluation of stress and ferromagnetic materials from anhysteretic and hysteresis curves comprising:

expressing the anhysteretic magnetization curve as a Langevin function depending on the magnetic field;

expressing stress in the material as an equivalent magnetic field dependent on stress and rate of change of magnetostriction with magnetization;

adding the equivalent magnetic field into the Langevin function;

assuming the behavior of magnetostriction to magnetization;

taking the derivative of the relationship between magnetostriction and magnetization;

substituting the derivative into the Langevin function;

expressing anhysteretic differential susceptibility at the origin computing anhysteretic differential susceptibility at the origin for the material in an unstressed state and a stressed state; and expressing the Langevin function in terms of anhysteretic differential susceptibility, both stressed and unstressed; solving for stress.

* * * * *